United States Patent [19]

Strickler

[11] Patent Number: 5,251,198
[45] Date of Patent: Oct. 5, 1993

[54] READING DEVICE FOR MULTI-LAYERED OPTICAL INFORMATION CARRIER

[76] Inventor: James H. Strickler, 109 Harvard Pl., Ithaca, N.Y. 14850

[21] Appl. No.: 891,938

[22] Filed: May 29, 1992

[51] Int. Cl.⁵ .............................................. G11B 7/12
[52] U.S. Cl. .................................... 369/110; 369/94; 369/100; 369/112
[58] Field of Search ................. 369/94, 100, 109, 110, 369/112, 284; 346/135.1; 430/945

[56] References Cited

U.S. PATENT DOCUMENTS

| | | | |
|---|---|---|---|
| 3,848,095 | 11/1974 | Wohlmut | 369/94 |
| 3,855,426 | 12/1974 | Bouwhuis | 369/111 |
| 3,946,367 | 3/1976 | Wohlmut et al. | 369/94 |
| 3,999,008 | 12/1976 | Bouwhis et al. | 369/111 |
| 3,999,009 | 12/1976 | Bouwhis et al. | 369/111 |
| 4,090,031 | 5/1978 | Russel | 369/108 |
| 4,163,600 | 8/1979 | Russel | 369/94 |
| 4,219,704 | 8/1980 | Russel | 369/108 |
| 4,450,553 | 5/1984 | Holster et al. | 369/94 |
| 4,819,210 | 4/1989 | Miura et al. | 369/100 |
| 4,905,215 | 2/1989 | Hattori et al. | 369/110 |

*Primary Examiner*—Paul M. Dzierzynski
*Assistant Examiner*—Jim Beyer

[57] ABSTRACT

A device for reading data stored in a high density multi-layered optical information carrier. Data which is stored in a carrier having a plurality of partially reflective data layers is read by wavefront shearing interferometry with low interlayer crosstalk. This allows data layers to be more closely spaced than previously possible thereby reducing spherical aberration and increasing the data density.

16 Claims, 3 Drawing Sheets

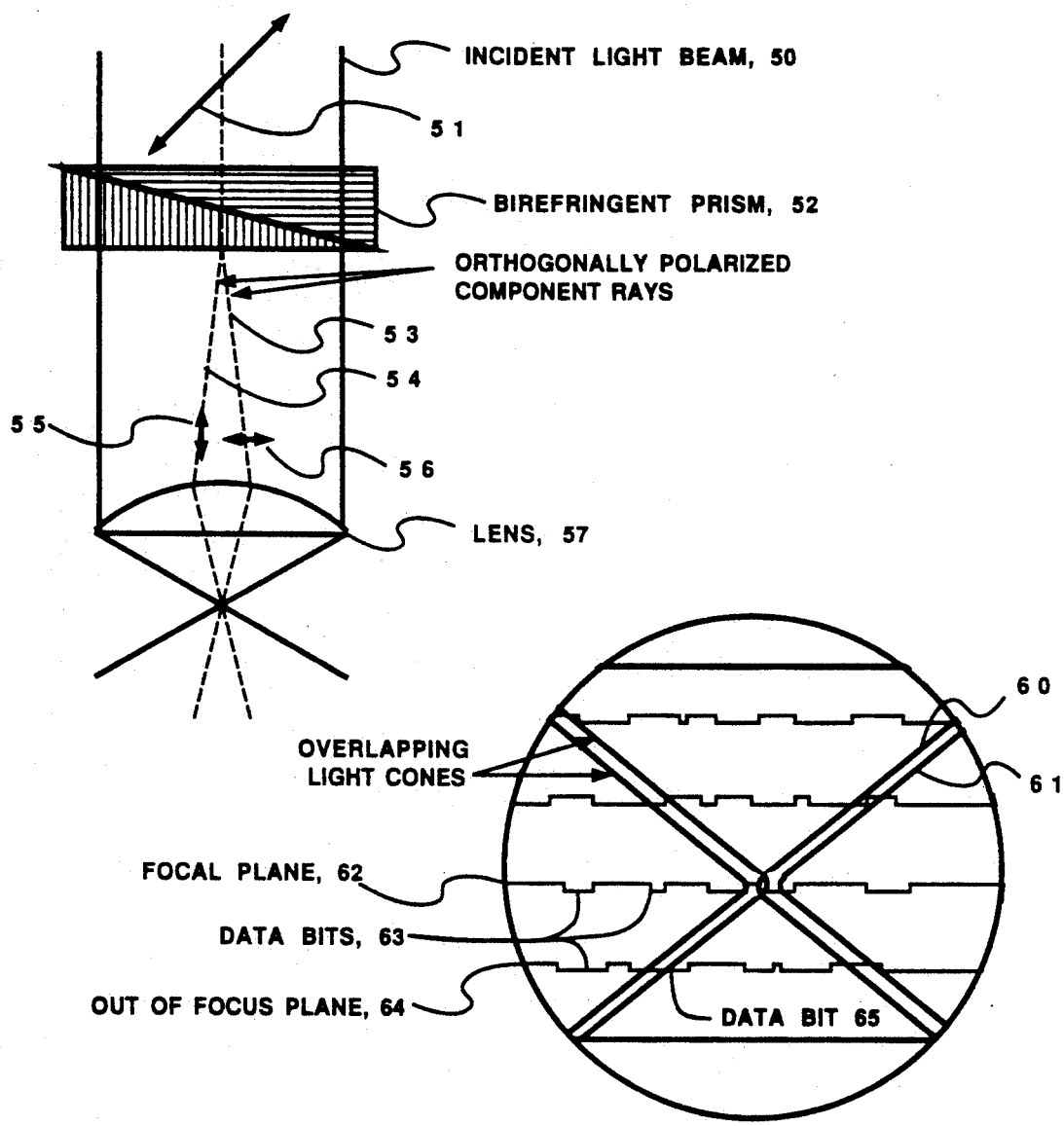

READING DEVICE FOR MULTI-LAYERED OPTICAL INFORMATION CARRIER

BACKGROUND OF THE INVENTION

Single data layer reflective disk technology is well known as audio, computer peripheral, interactive, and video products. For each of these products, information is encoded and recorded as a spiral data track of microscopic pits on the surface of a plastic disk. The pitted surface is covered with a very thin layer of metal to enhance its reflectivity and is then coated with a protective lacquer. These disks are inexpensive to produce using injection molding or embossing methods, and are favored for their large capacity, durability and economy.

Single layer reflective recordings are optically read by reflecting a tightly focused laser beam from the spiral data track using an optical pickup head. The data track is scanned under the head by rotating the disk and the reflected light is measured on a photodetector. The amount of light detected varies as the beam scans over the pits, and the time varying photocurrent signal is amplified and fed to an electronic circuit which decodes the information.

Since any disk warp causes the data track to move out of focus as the disk spins, and since any eccentricity causes the track to wobble radially, a pair of circuits is needed to control the position of the objective lens relative to the data stream, keeping it in focus and centered under the light beam. These circuits are jointly referred to as the "control system" of the optical head and are crucial to its function. A multi-element light detector is usually required to provide information to the control circuit so that it may follow the data stream as it wanders in the two orthogonal directions.

Since the diameter of the focussed spot of the laser beam may not be reduced below a certain diffraction limited minimum, the data density of the optical disk is limited. Data tracks may not be spaced closer together than about the twice the diameter of the focused spot or the signal from a particular track will be contaminated by interference or "crosstalk" from neighboring tracks.

The problem of crosstalk may be exacerbated by various optical aberrations which enlarge the focused spot size beyond its diffraction limited minimum. In particular, spherical aberration, in which marginal light rays are focused at a higher point than central rays due to the influence of the substrate, represents a significant problem. While a known degree of spherical aberration caused by a specified substrate thickness may be corrected by introducing a compensating aberration in the objective lens, any deviation from the specified value will lead to a residual uncorrected aberration. For this reason the thickness of optical disk substrates through which the beam passes must not vary by more than $+/-100$ micrometers.

A number of previous groups have proposed to increase the data capacity of optical read only disks by stacking multiple data layers on each disk. Multi-layered transmissive disks are described by Bouwhuis in U.S. Pat. Nos. 3,855,426; 3,999,008; 3,999,009; and by Wohlmut et al. in U.S. Pat. Nos. 3,848,095 and 3,946,367. Multi-layered reflective disks are described by Russell in U.S. Pat. Nos. 4,090,031; 4,163,600; 4,219,704; and by Holster et al. in U.S. Pat. Nos. 4,450,553. Multi-layered luminescent disks were also discussed by Russell and Bouwhuis in the above mentioned patents.

The capacity of multi-layered optical storage disks is generally limited by the following considerations:
1. A minimal inter-layer spacing is required to avoid crosstalk between layers.
2. Spherical aberration caused by re-focusing at different depths within the disk in order to access different data layers reduces resolution and requires reduction of transverse data density.
3. The limited working distance of useful objective lenses limits the number of possible layers that may be read without crashing the lens into the disk surface.

As mentioned above, data layers must be separated by sufficient distance that the signal from any particular layer is not contaminated by modulation from its neighboring layers. The rate at which the three dimensional modulation transfer function (MTF) of the optical detection scheme decays in the direction of the optic axis, namely the "degree of optical sectioning", determines the level of crosstalk between data layers as a function of their separation distance. For multi-layered disks described in the above named prior art, these separation distances must exceed 100 micrometers in order to achieve acceptable crosstalk levels since the MTFs fall off rather slowly the detection schemes used.

The relatively large separations between planes in earlier multi-layered disks lead to excessive variation of spherical aberration upon refocusing from layer to layer. A memory with 10 layers, for example, would span about 1 mm thickness, so that upon refocusing from the bottom layer to the top layer substantial spherical aberration would result leading to focus degradation and inter-track crosstalk. While dynamic spherical aberration corrective schemes are possible, such methods may prove difficult and expensive to incorporate in mass produced consumer products. An example of such a corrective scheme involves interposition of a compensating transparent plate of varied thickness between the objective lens and the disk.

In the prior art it has been proposed that multi-layered reflective disks may be read using the same methods as for single layer disks including the "central aperture" detection method and the "push-pull" detection method. In these methods the signal is derived from interference between the zeroth order diffracted beam and higher order diffracted beams.

Wavefront shearing interferometry is a well known optical technique and has been applied as differential interference contrast microscopy for examination of biological, mineral and other specimens. The principles of wavefront shearing interferometry and associated differential interference contrast microscopy are well described in Maksymilian Pluta, *Advanced Light Microscopy, Volume 2: Specialized Methods*, Chapter 7, pp. 144-197 Elsevier Press, N.Y. (1989). Wavefront shearing interferometry has been applied to reading multi-layered transmissive optical memories as described in Strickler et al., "Three dimensional optical data storage in refractive media by two-photon point excitation", Optics Letters, Vol. 16, No. 22 Nov. 15, 1991, pp. 1780-1782 and also in commonly owned U.S. patent application Ser. No. 07/733,030 filed Feb. 24, 1992.

It is an object of the invention to provide a method and apparatus for reading multi-layered optical information carriers with reduced crosstalk between layers so that the layers may be more closely spaced in order to reduce spherical aberration upon refocusing from layer to layer.

It is a further object to provide reduced crosstalk so as to facilitate tracking and focus control for multi-layered information recovery devices.

It is a further object to allow data layers to be more closely spaced so that more layers may be fit on a single device within the working distance of convenient and inexpensive objective lenses.

SUMMARY OF THE INVENTION

This invention provides methods and apparatus for reading information stored on multi-layered optical memory media with reduced inter-layer crosstalk. Reading is by wavefront shearing interferometry in which a laser beam is split using a birefringent prism into two slightly divergent beams of light which are then focused to adjacent points at a particular transverse data plane of the memory. The pathlengths of light reflected from these two adjacent points is compared interferometrically and the difference is used to indicate the data. Data bits which are out of focus will be mostly present in the paths of both beams and will thus not be perceived by the detection system. This important feature reduces inter-layer crosstalk and allows the tracking and focus control systems to function better than with prior data detection methods. The reduced inter-layer crosstalk also allows data layers to be spaced closer together so that spherical aberration associated with refocusing from layer to layer is reduced. The smaller inter-layer distance also allows more data layers to be placed within the finite working distance of convenient objective lenses.

BRIEF DESCRIPTION OF THE DRAWINGS

For a fuller understanding of the nature and objects of the invention, reference should be made to the following detailed description and the accompanying drawings, in which:

FIGS. 3A and 3B illustrate the general principle by which the present invention obtains its improved optical sectioning capability over alternative multi-layered media reading devices.

DETAILED DESCRIPTION

Figure 1:
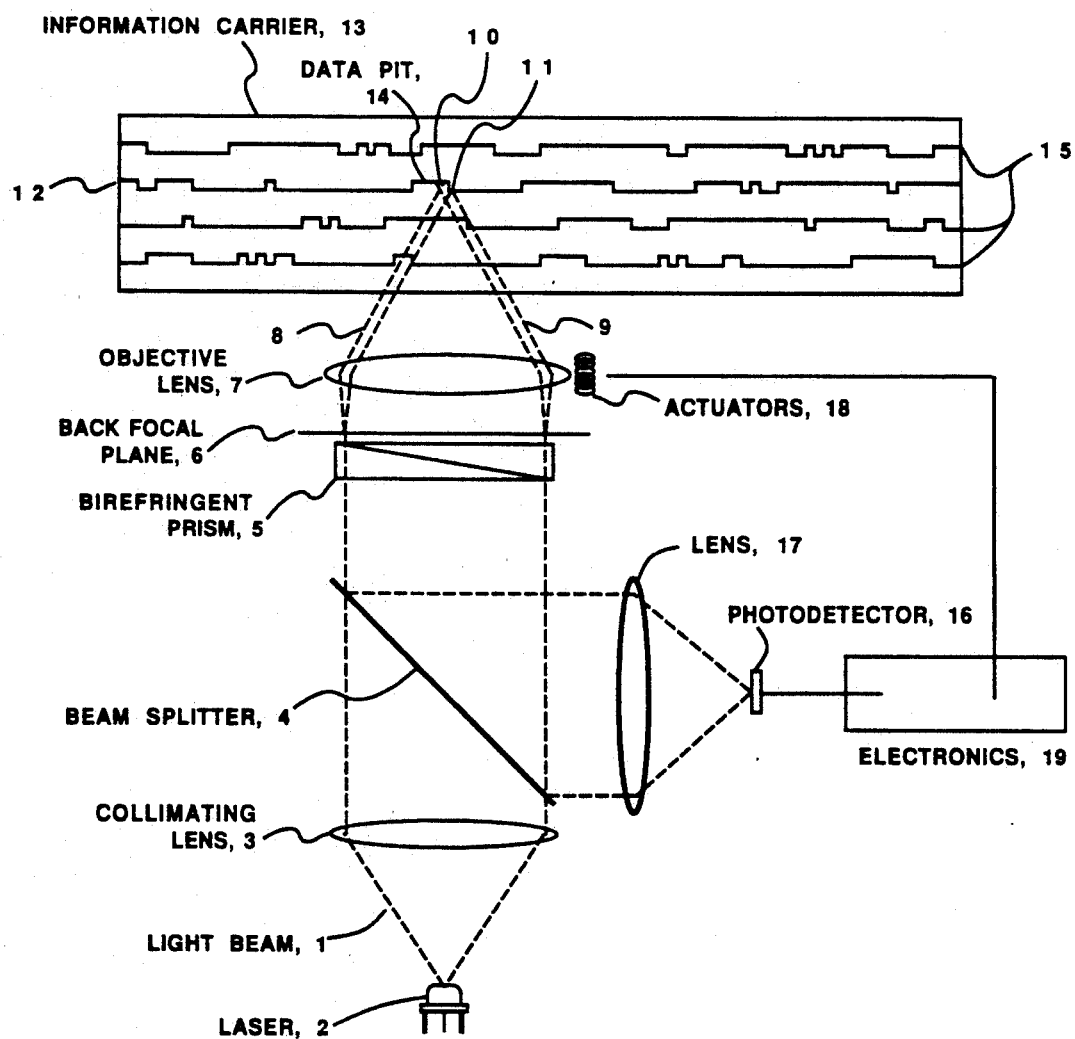
FIG. 1 is a schematic diagram depicting a multi-layered reflective information carrier and reading apparatus illustrative of the invention.

FIG. 1 shows schematically the principles of operation of the reading apparatus of the present invention. A polarized light beam, 1, from a laser, 2, is collimated by a lens, 3, and passes through a beam splitter, 4. In this system a birefringent prism, 5, such as a Wollaston prism, placed at or near the back focal plane, 6, of the objective lens, 7, causes the crossed polarized component beams, 8,9, of the plane polarized illumination beam, 1, to diverge slightly at that plane. These component beams are then focused to adjacent points, 10,11, at a desired transverse data plane, 12, within the multi-layered information carrier, 13, thus forming approximately a pair of partially overlapping cones. When one of the component beams is incident upon one of the data pits, 14, the optical pathlength of the reflected rays of that beam will differ from that of the other beam, thereby introducing a phase shift between the two reflected beams. When the reflected beams are recombined in the birefringent prism, 5, this phase shift will result in a polarization change of the resultant beam relative to that of the incident beam. This polarization change may be analyzed to produced a signal beam indicative of the data. This optical system is of particular advantage over prior systems in that it is insensitive to light reflected by out of focus planes, 15, since at those planes the component beams, 4,5, are largely overlapping so that no relative phase shift between the zeroth order reflected beams is produced. In the illustrated system the light reflected from the medium is deflected by the beam splitter 4 and is focused on a photodetector, 16, by a lens, 17.

The multi-layered information carrier is typically scanned under the view of the optical system, and may be in the form of either a tape or a disk. The current from the photodetector, 16, may be used in a variety of electronic feedback arrangements according to well established practice to maintain the focus and tracking of the objective lens on the data stream by means of actuator, 18.

Figure 2:
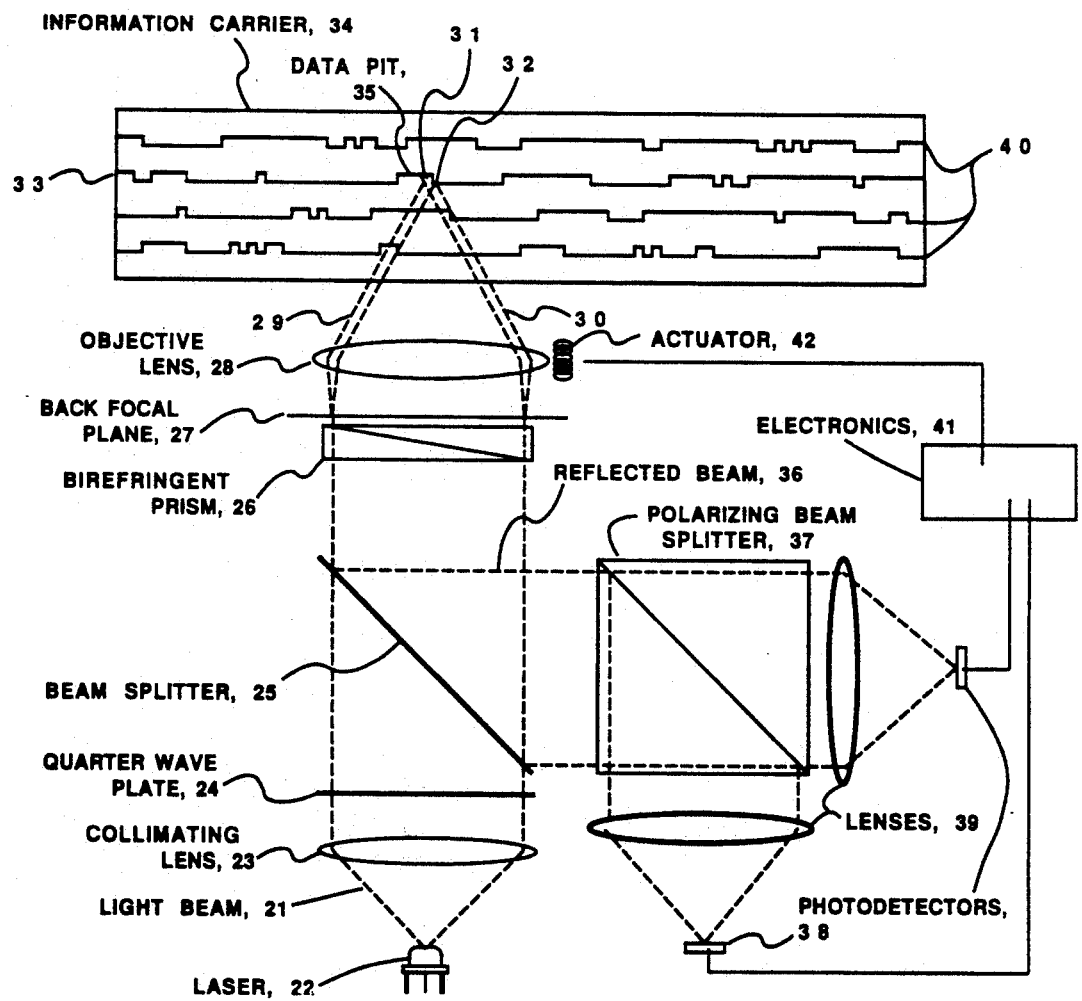
FIG. 2 is a schematic diagram depicting a multi-layered information carrier and an alternative reading apparatus illustrative of the invention.

In a second embodiment illustrated in FIG. 2 the linearly polarized light beam, 21, from the laser, 22, is collimated by lens, 23, circularly polarized by a quarter wave plate, 24, and passes through a beamsplitter, 25. A birefringent prism, 26, such as a Wollaston prism or Nomarski prism, is again placed at or near the back focal plane, 27, of the objective lens, 28, causing the orthogonally polarized component beams, 29,30, to diverge slightly at that plane. These component beams are then focused to adjacent points, 31,32, at a desired transverse data plane, 33, within the information carriers, 34, thus forming approximately a pair of partially overlapping cones. When one of the component beams is incident upon a data pit, 35, the optical pathlength of the reflected rays of one of the component beams will be longer than corresponding rays of the other beams thereby introducing a phase shift between the two reflected beams. When the reflected beams are recombined in the birefringent prism, 26, this phase shift will result in a polarization change of the resultant beam, 36, relative to that of the incident beam 21. The reflected beam, 36, is deflected by beamsplitter, 25, to a polarizing beam splitter, 37, whence the polarization change may be detected by directing orthogonally polarized component beams to a pair of light detectors, 38, by lenses, 39. This optical system is again insensitive to light reflected by out of focus planes, 40, since at those planes the component beams, 29,30, are largely overlapping so that no relative phase is produced by the data.

FIGS. 3A and 3B illustrate in greater detail the general principle of the invention which provides improved optical sectioning. A linearly polarized light beam, 50, with its polarization as viewed looking down the optic axis indicated by double headed arrow, 51, is incident upon a birefringent prism, 52, whence it is split into two divergent orthogonally polarized beams. A pair of orthogonally polarized rays, 53, 54, with their mutual divergence greatly exagerated, are shown with their polarizations indicated by double headed arrows, 55, 56. The beams are focused by lens, 57, to a pair of adjacent points at the focal plane, 62 so as to form a pair of partially overlapping light cones, 60, 61. When, at the focal plane, 62, one of the data bits, 63, is present in the path of one beam and not the other a phase shift is introduced between the reflected rays of the two beams. This phase shift leads to a charge in ellipticity of the reflected beams when they are recombined in the birefringent prism, 52. When a data bit, 65, is present in the path of one beam and not the other at an out of focus plane, 64, the net phase shift generated between the zeroth order reflected beams is much less than was generated at the focal plane since the intensity at out of focus planes is reduced relative to that at the focal plane. Hence, this optical device is much more sensitive to data at the focal plane.

It is noted that the data signal of these wavefront shearing methods is derived from interference between two zeroth order diffracted beams as distinguished from earlier methods for reading multi-layered reflective media which exploit interference with higher diffracted orders.

This system is also much less sensitive to interplane crosstalk than competing methods so that layers may be placed much closer together, separated by as little as 10-20 micrometers. This reduces difficulties associated with spherical aberration and objective lens working distance limits. The wavefront shearing method is completely compatible with the above mentioned focus and tracking control methods, and may be constructed for small additional cost compared to existing single layer products.

It is noted that the wavefront shearing interferometric reading method may be accomplished using devices other than a birefringent prism as the shearing element. For example, a holographic shearing optical element, or a grating may be used in place of the birefringent prism. However, because of the high shearing efficiency of the birefringent prism and because of the convenience of polarization analysis to derive a low background data signal the use of birefringent prisms is preferred.

It is noted that the above described reading method may be used with a number of well established tracking and focus control methods including but not limited to the Foucault knife edge method, the push-pull tracking method, the pupil obscuration method, the twin spot method and others.

It is useful to have the different data layers of the multi-layered information carrier labeled with distinct data codes to enable the device to identify which layer is being read. For example, a segment of the data block address may be reserved for a layer label. For layer identification of a frequency modulated recording layer identifying subfrequencies may be recorded.

It will thus be seen that the invention efficiently attains the objects set forth above, in particular improving the optical sectioning capability of high capacity multi-layered memory reading devices, reducing interlayer crosstalk and allowing layers to be spaced closer together, thereby reducing deleterious spherical aberration and increasing the capacity of the information carrier.

It will be understood that changes may be made in the above construction and in the foregoing sequences of operation without departing from the scope of the invention. For example, the orientation of the shearing device may be modified with respect to the data stream or additional lenses or optical elements may be inserted into the optical path.

It is accordingly intended that all matter contained in the above description or shown in the accompanying drawings be interpreted as illustrative rather than in a limiting sense.

It is also to be understood that the following claims are intended to cover all the generic and specific features of the invention as described herein, and all statements of the scope of the invention which, as a matter of language, might be said to fall therebetween.

Having described the invention, what is claimed as new and secured by Letters Patent is:

1. A device for reading an optical information carrier having a plurality of partially reflective data layers comprising:
   light beam means for illuminating said carrier;
   shearing means for splitting said light beam into two divergent component light beams;
   focusing means for focusing said component light beams to adjacent locations at one of said data layers;
   collection means for collecting component light beams reflected from said carrier;
   recombining means for merging said reflected component light beams to form a single beam;
   detection means for determining the intensity of said single beam.

2. A device for reading an optical information carrier having a plurality of partially reflective data layers comprising:
   polarized light beam means for illuminating said media;
   shearing means for splitting said light beam into two divergent component light beams;
   focusing means for focusing said component light beams to adjacent locations at one of said data layers;
   means for collecting component light beams reflected from said information carrier;
   recombining means for merging said reflected component light beams to form a single beam;
   analyzer means for determining polarization state of said single beam, said polarization state being indicative of said data.

3. A device for reading a multi-layered reflective information carrier, as in claim 2, wherein said polarized light beam is linearly polarized.

4. A device for reading a multi-layered reflective information carrier, as in claim 2, wherein said polarized light beam is circularly polarized.

5. A device for reading a multi-layered reflective information carrier, as in claim 2, wherein said shearing means is a birefringent prism.

6. A device for reading a multi-layered reflective information carrier, as in claim 5, wherein said shearing means is a Wollaston prism.

7. A device for reading a multi-layered reflective information carrier, as in claim 5, wherein said shearing means is a Nomarski prism.

8. A device for reading a multi-layered reflective information carrier, as in claim 2, wherein said focusing means is a lens.

9. A device for reading a multi-layered reflective information carrier, as in claim 2, wherein said focusing means is a diffractive optical element.

10. A device for reading a multi-layered reflective information carrier, as in claim 2, wherein said collecting means is a lens.

11. A device for reading a multi-layered reflective information carrier, as in claim 2, wherein said collecting means is a diffractive optical element.

12. A device for reading a multi-layered reflective information carrier, as in claim 2, wherein said recombining means is a birefringent prism.

13. A device for reading a multi-layered reflective information carrier, as in claim 12, wherein said recombining means is a Wollaston prism.

14. A device for reading a multi-layered reflective information carrier, as in claim 12, wherein said recombining means is a Nomarski prism.

15. A device for reading a multi-layered reflective information carrier, as in claim 2, wherein said analyzer means is a polarizer followed by a light detection means.

16. A device for reading a multi-layered reflective information carrier, as in claim 2, wherein said analyzer means is a polarizing beam splitter followed by a pair of light detection means.

* * * * *